(12) United States Patent
Zhang et al.

(10) Patent No.: US 10,497,141 B2
(45) Date of Patent: Dec. 3, 2019

(54) THREE-DIMENSIONAL IMAGING USING FREQUENCY DOMAIN-BASED PROCESSING

(71) Applicant: AMS SENSORS SINGAPORE PTE. LTD., Singapore (SG)

(72) Inventors: Chi Zhang, Fremont, CA (US); Alireza Yasan, San Jose, CA (US); Hendrik Volkerink, Santa Clara, CA (US)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/066,798

(22) PCT Filed: Dec. 23, 2016

(86) PCT No.: PCT/SG2016/050616
§ 371 (c)(1),
(2) Date: Jun. 28, 2018

(87) PCT Pub. No.: WO2017/119846
PCT Pub. Date: Jul. 13, 2017

(65) Prior Publication Data
US 2019/0005671 A1 Jan. 3, 2019

Related U.S. Application Data

(60) Provisional application No. 62/275,572, filed on Jan. 6, 2016.

(51) Int. Cl.
*G06K 9/52* (2006.01)
*G06T 7/593* (2017.01)
(Continued)

(52) U.S. Cl.
CPC ............ *G06T 7/593* (2017.01); *G06K 9/3233* (2013.01); *G06K 9/522* (2013.01); *G06K 9/6201* (2013.01);
(Continued)

(58) Field of Classification Search
CPC ........... G06T 7/593; G06T 2207/10028; G06T 2207/10012; G06T 2207/20056;
(Continued)

(56) References Cited

U.S. PATENT DOCUMENTS

| 8,009,358 B2 * | 8/2011 | Zalevsky | ........... G02B 27/0927 |
| | | | 359/618 |
| 9,746,921 B2 * | 8/2017 | Mallinson | ............... G06F 3/014 |

(Continued)

OTHER PUBLICATIONS

S. Lehar, "An Intuitive Explanation of Fourier Therory," http://cns-alumni.bu.edu/~slehar/fourier/fourier.html (printed on Jan. 6, 2016).
(Continued)

*Primary Examiner* — Shan E Elahi
(74) *Attorney, Agent, or Firm* — Michael Best & Friedrich LLP

(57) ABSTRACT

A brightness image of a scene is converted into a corresponding frequency domain image and it is determined whether a threshold condition is satisfied for each of one or more regions of interest in the frequency domain image, the threshold condition being that the number of frequencies in the region of interest is at least as high as a threshold value. The results of the determination can be used to facilitate selection of an appropriate block matching algorithm for deriving disparity or other distance data and/or to control adjustment of an illumination source that generates structured light for the scene.

18 Claims, 10 Drawing Sheets

(51) Int. Cl.
*G06T 7/521* (2017.01)
*H04N 13/254* (2018.01)
*H04N 13/239* (2018.01)
*G06K 9/32* (2006.01)
*G06K 9/62* (2006.01)
*H04N 13/257* (2018.01)
*H04N 13/271* (2018.01)
*H04N 13/00* (2018.01)

(52) U.S. Cl.
CPC ............ *G06T 7/521* (2017.01); *H04N 13/239* (2018.05); *H04N 13/254* (2018.05); *H04N 13/257* (2018.05); *H04N 13/271* (2018.05); *G06T 2207/10012* (2013.01); *G06T 2207/10028* (2013.01); *G06T 2207/20056* (2013.01); *H04N 2013/0081* (2013.01)

(58) Field of Classification Search
CPC .... G06T 7/521; H04N 13/271; H04N 13/257; H04N 13/239; H04N 13/254; H04N 2013/0081; G06K 9/522; G06K 9/6201; G06K 9/3233; G06F 1/32
USPC .................................................. 375/240.12
See application file for complete search history.

(56) References Cited

U.S. PATENT DOCUMENTS

| | | | | |
|---|---|---|---|---|
| 9,973,616 | B2* | 5/2018 | Ito ..................... | H04M 1/72533 |
| 2004/0240725 | A1* | 12/2004 | Xu .......................... | G06K 9/32 |
| | | | | 382/154 |
| 2007/0273957 | A1* | 11/2007 | Zalevsky ........... | G02B 27/0927 |
| | | | | 359/326 |
| 2009/0022396 | A1* | 1/2009 | Watanabe ............ | G06K 9/4633 |
| | | | | 382/167 |
| 2010/0157416 | A1* | 6/2010 | Sugaya ................. | G02B 6/264 |
| | | | | 359/334 |
| 2012/0262561 | A1* | 10/2012 | Fukutake ............... | G02B 21/12 |
| | | | | 348/79 |
| 2014/0002445 | A1* | 1/2014 | Xiong ................. | H04N 13/271 |
| | | | | 345/419 |
| 2014/0146394 | A1* | 5/2014 | Tout ....................... | G09B 9/307 |
| | | | | 359/630 |
| 2015/0119652 | A1* | 4/2015 | Hyde ................... | A61B 5/0022 |
| | | | | 600/301 |
| 2016/0187974 | A1* | 6/2016 | Mallinson ............... | G06F 3/014 |
| | | | | 463/32 |

OTHER PUBLICATIONS

ISA/AU, International Search Report for PCT/SG2016/050616 (dated Mar. 9, 2017).

* cited by examiner

THREE-DIMENSIONAL IMAGING USING FREQUENCY DOMAIN-BASED PROCESSING

FIELD OF THE DISCLOSURE

The present disclosure relates to three-dimensional imaging using frequency domain-based processing.

BACKGROUND

Various methods are available for acquiring three-dimensional distance data (e.g., depth or disparity data) of a scene that includes one or more objects. Such techniques include stereo-based, time-of-flight-based and encoded-light-based techniques. These techniques generally employ active illumination of the objects in the scene. The active illumination is comprised of a particular range of wavelengths. Further the intensity of the active illumination often is spatially modulated and/or temporally modulated. Some of the incident light is reflected from the objects and is focused onto an array of pixels that are sensitive to the particular range of wavelengths making up the illumination. This sensed light then converted into an electric signal.

Systems that implement the foregoing types of techniques often require significant amounts of power and computational resources. For example, generating the active illumination can consume a relatively large amount of power. Further, in some cases, ambient light (e.g., infra-red background radiation) can obscure the active illumination. In such instances, generating the active illumination is a waste of resources and power.

Some imaging systems employ stereo-based techniques to collect a stereo-image pair of images (e.g., a reference and search image, or a pair of left and right images). Disparity (i.e., 3D data) between the stereo-image pair typically is determined through a matching algorithm that identifies corresponding pixels between the pair of images. Various matching techniques can be employed. For example, stereo-based techniques that do not employ active illumination through the active generation of texture onto objects in the scene typically use semi-global or global block matching algorithms. As no active illumination is employed in such cases, the semi-global or global block matching algorithms must successfully determine the correspondence between the images using only native texture (e.g., object edges, physical texture) which typically is sparse in real-life scenes. These algorithms can be particularly resource intensive with respect to power consumption and use of computational resources. On the other hand, stereo-based techniques that employ active illumination to generate texture onto objects in the scene sometimes employ simple block matching techniques to determine the correspondence between the image pair. Such simple block matching techniques tend to be far less demanding on resources.

SUMMARY

The present disclosure relates to three-dimensional imaging using frequency domain-based processing.

For example, in one aspect, a method includes illuminating a scene with structured light, detecting optical signals reflected by one or more objects in the scene, and converting the detected optical signals to corresponding electrical signals representing a brightness image of the scene. The brightness image is converted into a corresponding frequency domain image. The method includes determining whether a threshold condition is satisfied for each of one or more regions of interest in the frequency domain image, the threshold condition being that the number of frequencies in the region of interest is at least as high as a threshold value. If it is determined that the threshold condition is satisfied for fewer than a predetermined minimum number of the one or more regions of interest, a control signal is generated to adjust an optical power of an illumination source that generates the structured light.

Some implementations include one or more of the following features. For example, in some cases, the threshold condition is that the number of frequencies, which have an amplitude at least as high as a threshold amplitude, is at least as high as the threshold value. Some instances include either stopping generation of the structured light in response to the control signal or increasing an optical power level of the structured light in response to the control signal.

In accordance with another aspect, a method includes acquiring first and second stereo images of a scene, and transforming a first one of the stereo images into a corresponding frequency domain image. The method includes determining whether a threshold condition is satisfied for each of one or more regions of interest in the frequency domain image, the threshold condition being that the number of frequencies in the region of interest is at least as high as a threshold value. If it is determined that the threshold condition is satisfied for at least a predetermined minimum number of the one or more regions of interest, a first block matching technique is applied to the first and second stereo images. if it is determined that the threshold condition is not satisfied for at least a predetermined minimum number of the one or more regions of interest, a second block matching technique is applied to the first and second images. The second block matching technique is different from the first block matching technique. Data indicative of distance to one or more objects in the scene can be derived based on results of the applied block matching technique.

Some implementations include one or more of the following features. For example, in some cases, the first block matching technique consumes less computational resources than the second block matching technique. As an example, the first block matching technique can comprises a sum of absolute differences technique, whereas the second block matching technique can comprise a global or semi-global block matching technique. In some instances, the threshold condition is that the number of frequencies, which have an amplitude at least as high as a threshold amplitude, is at least as high as the threshold value.

Three-dimensional imaging systems also are described and can include one or more processors to implement various features. Further, in some implementations, the foregoing methods can be combined so as to facilitate selection of an appropriate block matching algorithm as well as to control adjustment of an illumination source.

The techniques and systems described here can, in some cases, help reduce power consumption and/or reduce the demand on computational resources. For example, in some implementations, the present techniques allow a relatively complex block matching algorithm (e.g., semi-global/global block matching algorithms) to be employed only in situations where texture is lacking (e.g., when native and/or projected texture are beneath a threshold value). A less complex block-matching algorithm can be used in situations where texture is sufficiently distributed throughout the scene over the object(s) of interest (e.g., when native and/or projected texture are equal to or above the threshold value). An example of a situation in which texture might be insufficient to employ a simple block matching algorithm is when ambient light is sufficiently intense such that active illumination is no longer discernable by the imaging cameras.

Further, the imaging system can be optimized to generate active illumination only when the active illumination is needed or useful. This allows the system to adapt to different lighting conditions and to employ resources (including optical power) in a more efficient manner.

Other aspects, features, and advantages will be apparent from the following detailed description, the accompanying drawings, and the claims.

DETAILED DESCRIPTION

Figure 1A:
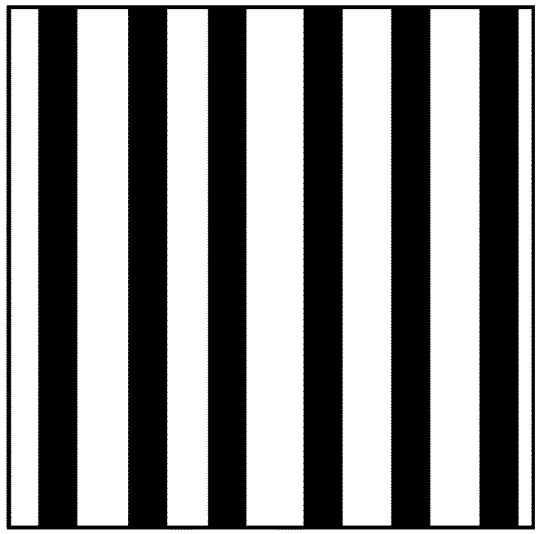
FIG. 1A shows an example of a sinusoidal brightness image.
Figure 1B:
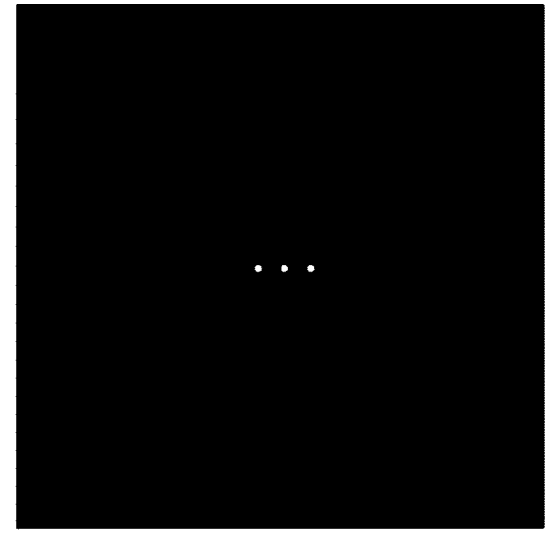
FIG. 1B shows the image's two-dimensional Fourier transform.

FIG. 1A shows an example of a sinusoidal brightness image, and FIG. 1B shows the image's two-dimensional Fourier transform. The Fourier image encodes the same information as the brightness image except that it is expressed in terms of amplitude as a function of spatial frequency, rather than brightness as a function of spatial displacement. Each pixel in the Fourier image has a spatial frequency value. In the illustrated Fourier image, the center pixel corresponds to the DC term, and the pixels on either side of the center encode the sinusoidal pattern. The brighter the peaks in the Fourier image, the higher the contrast in the brightness image. In this simple example, there is only one Fourier component; thus all other values in the Fourier image are zero and are depicted as black. The distance from the center of the Fourier image correlates to the frequency. Thus, a higher spatial frequency component in the brightness image corresponds to a pixel further from the center of the Fourier image.

Figure 2A:
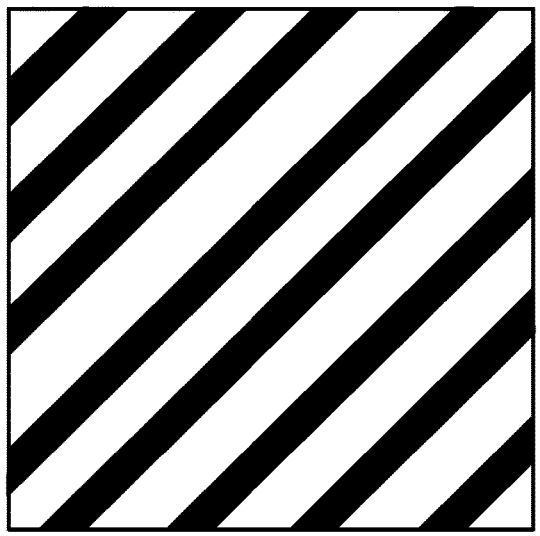
FIG. 2A shows an example of another sinusoidal brightness image.
Figure 2B:
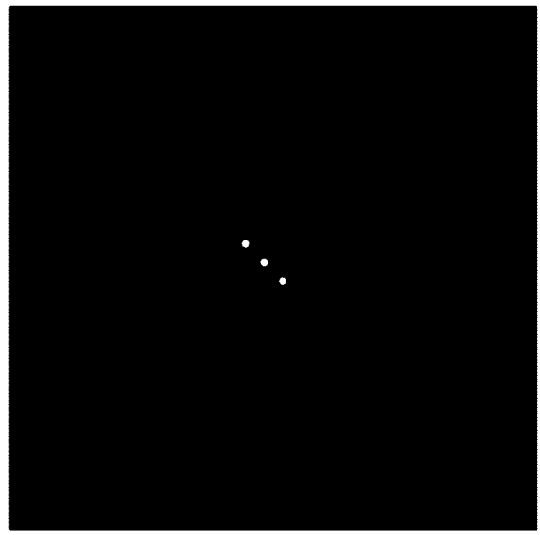
FIG. 2B shows the image's two-dimensional Fourier transform.

The orientation of the sinusoid correlates with the orientation of the peaks in the Fourier image relative to the central DC point. Thus, the tilted sinusoidal pattern in the brightness image of FIG. 2A transforms to a tilted pair of peaks in the Fourier image of FIG. 2B. Further, different Fourier coefficients can be combined additively to produce a combination pattern. For example, a brightness image that is an additive combination of the brightness images of FIGS. 1A and 2A transforms to a Fourier image that is an additive combination of the Fourier images of FIGS. 1B and 2B.

The present disclosure is based, in part, on the realization by the inventors that for a given structured illumination of a scene (e.g., illumination that includes projected texture, encoded light, or a spatially modulated light pattern), the light reflected by the scene can be expected to result in a brightness image whose two-dimensional Fourier transform has certain characteristics. The Fourier-transformed brightness image can be segmented into one or more regions. Decisions regarding processing of the brightness image are made by a processing system based, at least in part, on whether at least each of a predetermined number of the regions contains a minimum number of frequency values (or more). For example, in some cases, the processing system can determine that providing the structured illumination will not be useful and that, therefore, the structure illumination should be discontinued, thereby resulting in power savings. Or in some cases, the illumination can be controlled in other ways, such as by increasing the optical strength of the illumination, in an attempt to make it discernible over the ambient light. Likewise, in some cases, the processing system can determine whether a simple block matching technique can be used, or whether a computationally complex block matching technique (e.g., global or semi-global block matching) may be needed.

Figure 3:
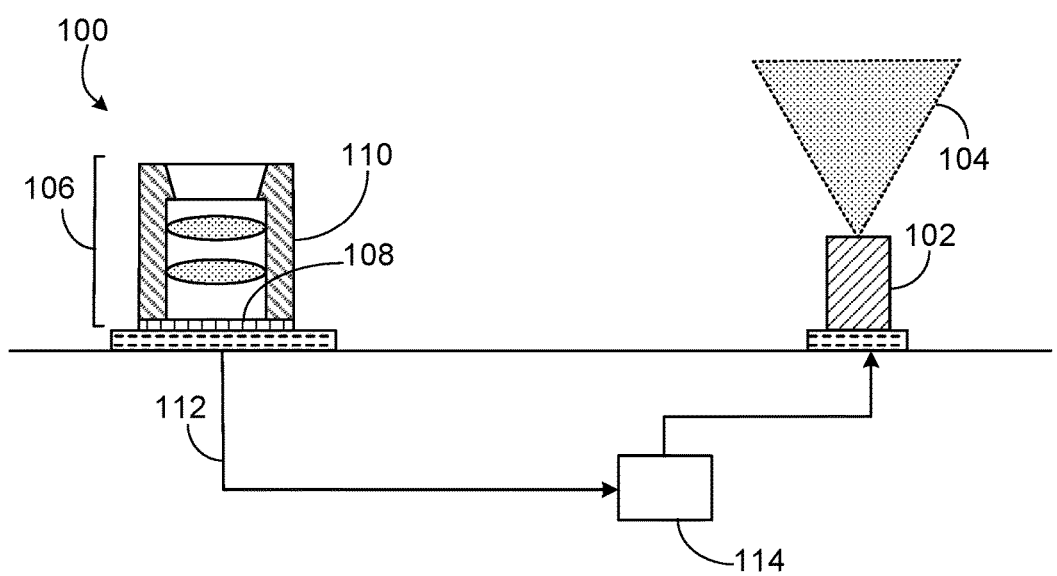
FIG. 3 is an example of a three-dimensional imaging system.

FIG. 3 illustrates a first example in which a system 100 for three-dimensional imaging includes a source 102 arranged to generate structured illumination 104 such as encoded light (e.g., infra-red radiation). The structured illumination 104 can be projected onto a scene that includes one or more objects. The illumination source 102 can be implemented, for example, as a driver integrated circuit that drives a light emitting diode (LED), an infra-red (IR) LED, an organic LED (OLED), an infra-red (IR) laser or a vertical cavity surface emitting laser (VCSEL). The system 100 also includes at least one depth camera 106 that is sensitive to the wavelength(s) of illumination generated by the source 102. The depth camera 106 can include an array of pixels 108 implemented, for example, as CMOS or CCD image sensors or as time-of-flight (TOF) sensors. The camera 106 has an optical channel that includes a beam shaping system 110 such as a lens stack held within a lens barrel. Optical signals sensed by camera 106 are converted to electrical signals that are provided to one or more processor units 114 over signal line(s) 112 for processing. The processor unit(s) 114 can include, for example, a central processing unit (CPU) of a personal computing device (e.g., PC, laptop, tablet, personal digital assistant (PDA)) or a standalone microprocessor chip. In some cases, the processor 114 can be the processor of a mobile device (e.g., smartphone).

Figure 4:
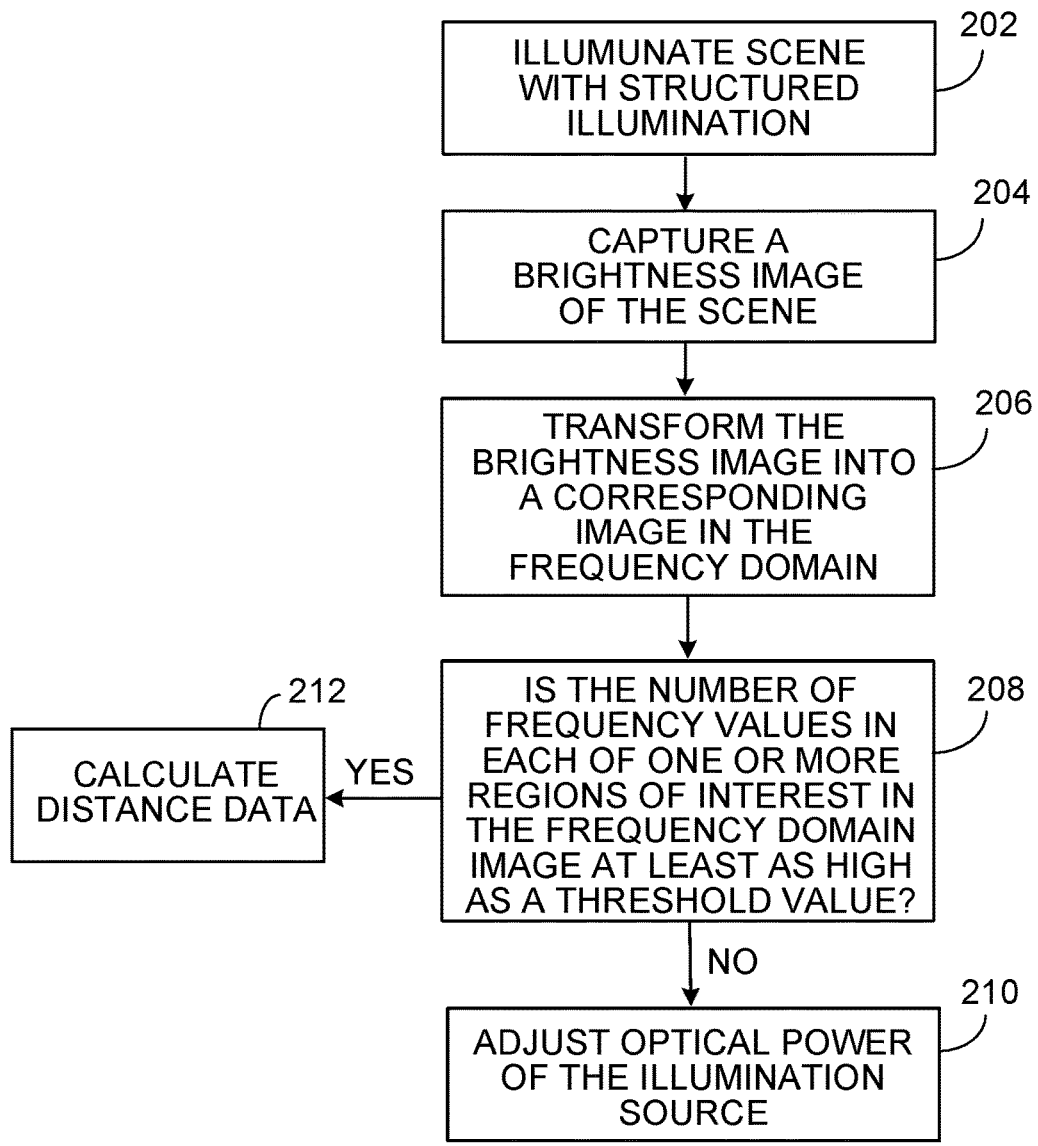
FIG. 4 illustrates a method of operation of the system of FIG. 3.

In operation, the illumination source 102 illuminates a scene with the structured illumination 104 (see 202 in FIG. 4). In response, the depth camera 106 captures a brightness image of the scene (204), which includes the structured illumination reflected by the scene. Signals representing the brightness image captured by the depth camera 106 are provided to the processor unit 114, which transforms the brightness image into a corresponding Fourier image (i.e., an image in the frequency domain) (206). In this and the following description, reference is sometimes made to a single processor unit performing various functions or operations. However, more generally, the functions and operations may be performed either by a single processor unit or collectively by multiple processor units.

The processor unit 114 then determines whether the number (N) of frequency values in each of one or more regions of interest in the Fourier image is at least as high as a threshold value (T) (208). The threshold value (T) can be set, for example, based on expected characteristics of the detected image in view of the structured illumination reflected by the scene. For example, in some cases, it may be expected that the structured illumination will result in a brightness image whose corresponding Fourier image has frequency values that fall largely within a specified range (e.g., defined by upper and lower frequency threshold values).

Figure 5:
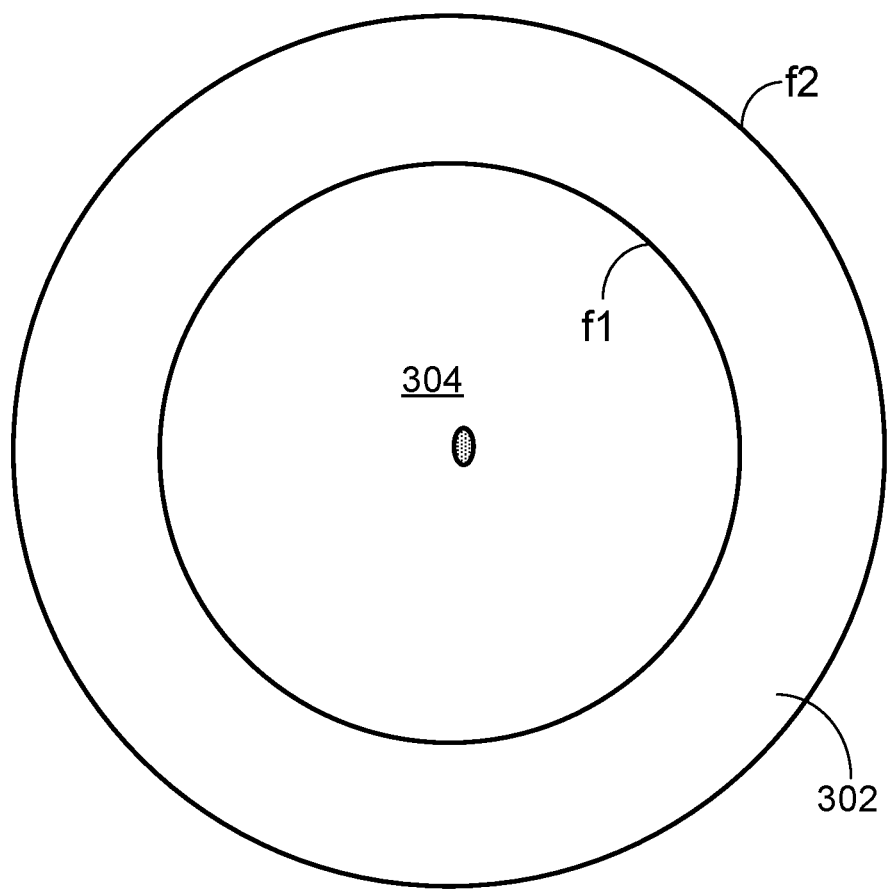
FIG. 5 shows different regions of a Fourier image.

FIG. 5 shows an example in which the region of interest 302 in the Fourier image is the area between two concentric circles, which correspond, respectively, to a lower frequency value (f1) and an upper frequency value (f2). Based on the structured illumination 104, it may be expected, for example, that the number (N) of frequency values falling within the region 302 between f1 and f2 will be at least as great as the threshold value (T). In some cases, it will be desirable to exclude, from the region(s) of interest, the region 304 near the origin of the Fourier image because the frequency values in the region 304 (i.e., the DC or other low-frequency components) are not likely to correspond to the projected texture.

If the processor unit 114 determines that the number of frequency values in the region of interest is less than the threshold value, the determination indicates that the ambient light is relatively high such that it is not possible for the camera 106 to discern the structured illumination reflected by the scene. In that case, the processor unit 114 can generate a control signal to turn off the illumination source 102 (see 210 in FIG. 4) so as not to expend the additional energy required to operate the illumination source 102. In some implementations, instead of turning off the illumination source 102, the processor unit 114 can generate a control signal that causes the optical power of the illumination source 102 to be adjusted in other ways. For example, the optical power can be increased, and the process of FIG. 4 can be repeated to determine whether increasing the optical power allows the structured illumination to be discerned by the camera 106.

If the processor unit 114 determines (at 208) that the number of frequency values in the region of interest is equal to or greater than the threshold value, the processor unit 114 proceeds to calculate distance data (e.g., depth or disparity data) based on the brightness image (212). Illumination by the source 102 can continue, and additional distance data can be obtained and processed.

Figure 6:
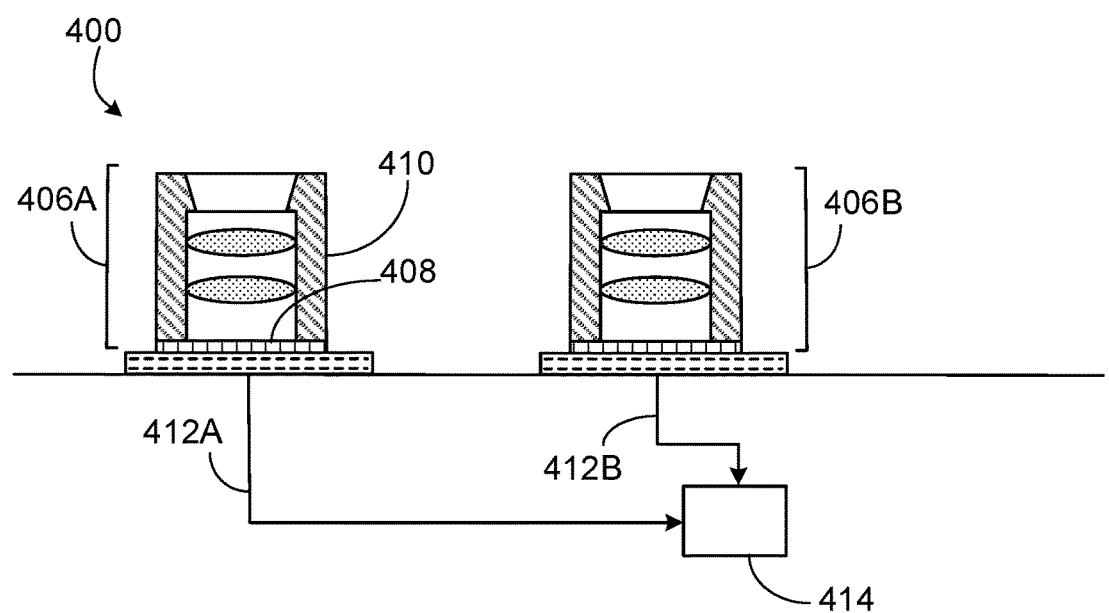
FIG. 6 is an example of a three-dimensional stereo imaging system.

As mentioned above, similar techniques can be used in stereo imaging systems to determine whether a simple block matching technique can be used to process the image data, or whether a computationally complex block matching technique (e.g., global or semi-global block matching) should be employed. FIG. 6 illustrates an example of a stereo imaging system that includes first and second stereo imaging cameras 406A, 406B. Each camera 406A, 406B can include, for example, an array of pixels 408 such as an infra-red (IR) CMOS image sensor or CCD image sensor. Each of the cameras 406A, 406B has an optical channel that includes a beam shaping system 410 such as a lens stack held within a lens barrel. Optical signals sensed by the cameras 406A, 406B are converted to electrical signals that are provided to one or more processor units 414 over signal lines 412A, 412B for processing. The processor unit(s) 414 can include, for example, a central processing unit (CPU) of a personal computing device (e.g., PC, laptop, tablet, personal digital assistant (PDA)) or a standalone microprocessor chip. In some cases, the processor 414 can be the processor of a mobile device (e.g., smartphone).

Figure 7:
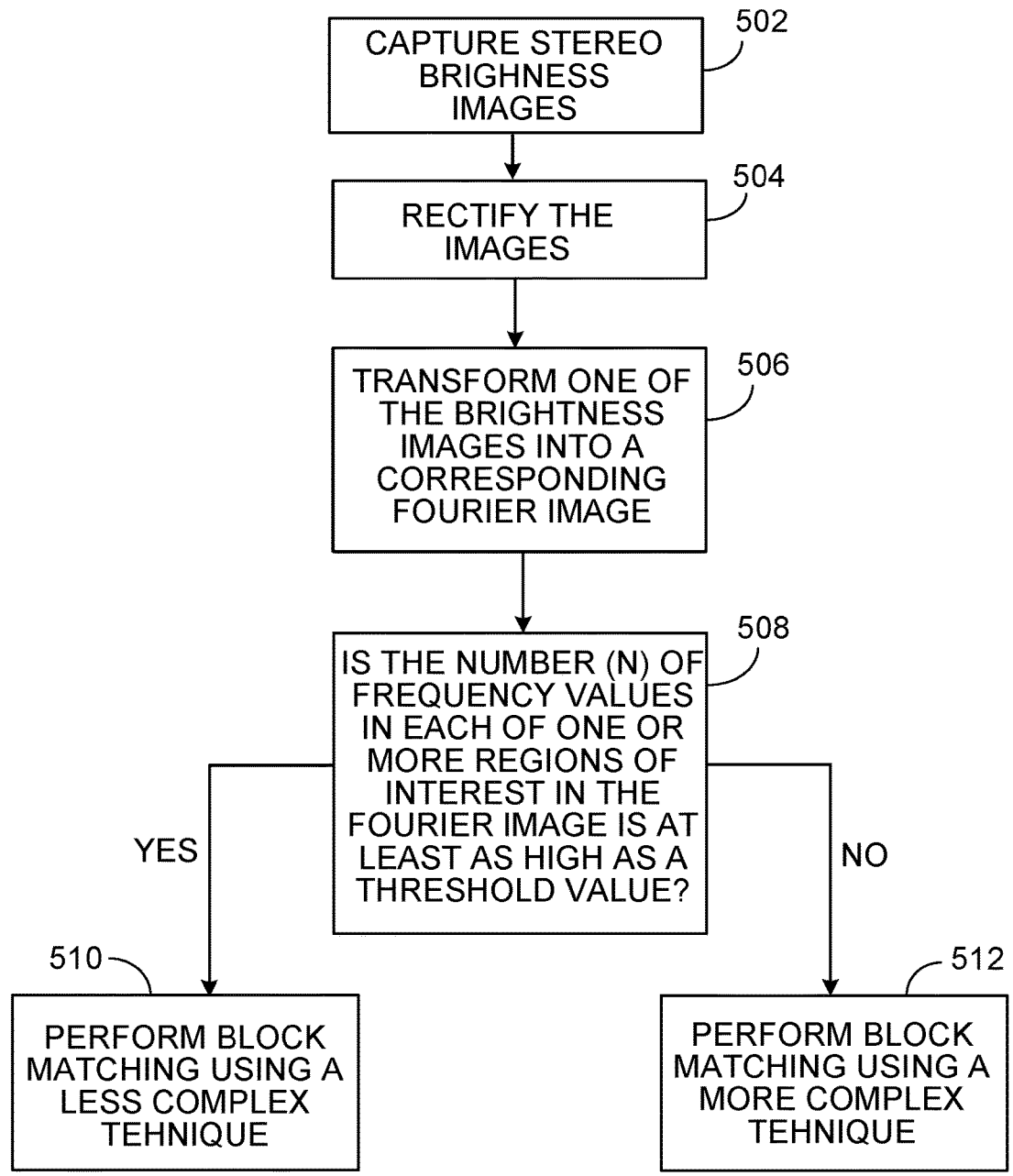
FIG. 7 illustrates a method of operation of the system of FIG. 6.

In operation, each of the stereo cameras 406A, 406B captures a respective brightness image (see 502 in FIG. 7). In some instances, the images are rectified, for example, using calibration data (504). An image captured by one of the cameras (e.g., 406A) can be used as a reference image, whereas an image captured by the other camera can be used as a search image for a block matching algorithm, which allows disparity information to be computed from the pair of stereo images by computing the distance in pixels between the location of a feature in one image and the location of the same or substantially same feature in the other image. Thus, the image acquired by the second camera 406B is searched to identify the closest match for a small region (i.e., block of pixels) in the image acquired by the first camera 406A. Various techniques can be used to determine how similar regions in the two images are, and to identify the closest match. Some techniques require a relatively small amount of computational resources and/or power. One such known technique is the "sum of absolute differences," sometime referred to as "SAD." Other techniques are more complex and require a greater amount of computational resources and/or power. Examples include global optimization methods that generate a disparity for each pixel in the reference image. Such approaches take into account global constraints (e.g., smoothness and/or image edges) and seek to minimize an energy function, which determines whether two pixels (i.e., one in the reference image, and one in the search image) are a match. Semi-global block matching (SGBM) is a particular example for minimizing the global energy function.

The processor unit 414 is operable to select either one of at least two block matching techniques to apply to the acquired images. To decide which block matching technique to use, the processor unit 414 can perform the following steps. First, as indicated by 506, the processor unit 414 transforms one of the brightness images into a corresponding Fourier image (i.e., an image in the frequency domain). Next, the processor unit 414 determines whether the number (N) of frequency values in each of one or more regions of interest in the Fourier image is at least as high as a threshold value (T) (508). The threshold value (T) can be set, for example, based on expected characteristics of the detected image. For example, the Fourier transform can represent even harsh rectilinear shapes having sharp boundaries in the brightness image. Such boundaries typically require higher-order terms, or higher harmonics (i.e., higher frequencies). Thus, in some cases, it may be expected that the Fourier image corresponding to the brightness image will include frequency values that fall largely within a specified range (e.g., defined by upper and lower frequency threshold values).

If the processor unit 414 determines that the number of frequency values in the region of interest is equal to or greater than the threshold value, the determination indicates that a relatively simple block matching technique (e.g., SAD) can be used. In that case, the processor unit 414 performs the block matching using the lower complexity technique (510). On the other hand, if the processor unit 114 determines (at 508) that the number of frequency values in the region of interest is less than the threshold value, the determination indicates that a more complex block matching technique (e.g., SGBM) should be used. In that case, the processor unit 414 performs the block matching using the more complex technique (512). Based on results of the selected block matching technique, the processor unit 514 computes disparity information for the pair of stereo images.

The calculated disparities provide information about the relative distance of the scene elements from the cameras. Thus, the stereo matching enables disparities (i.e., distance data) to be computed, which allows depths of surfaces of objects of a scene to be determined. The techniques described here may be suitable, in some cases, for real-time applications in which the output of a computer process (i.e., rendering) is presented to the user such that the user observes no appreciable delays that are due to computer processing limitations. The techniques described here can be particularly advantageous, for example, in hand-held mobile devices. The techniques can be used in various applications, including, for example, 3D image reconstruction and 3D printing.

Figure 8:
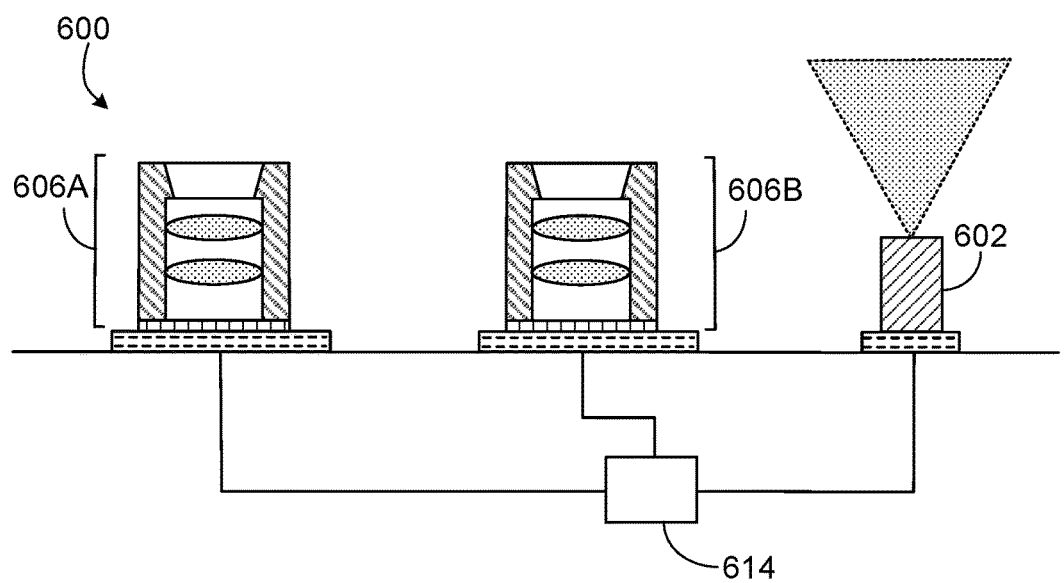
FIG. 8 is another example of a three-dimensional stereo imaging system.

In some instances, instead of transforming one of the brightness images in its entirety into a corresponding image in the frequency domain (i.e., at 508 in FIG. 7), the foreground portion of the brightness images is extracted, and only the foreground is transformed into a corresponding image in the frequency domain. Such a process can allow more distant objects in the scene (for which the disparity values tend to be very small) to be ignored, thereby optimizing the process for closer objects (for which disparity values tend to be greater than for more distant objects). One way of obtaining the foreground image is to calculate the absolute difference of the stereo pair of images (e.g., on a pixel-by-pixel basis), which effectively eliminates the background. In some instances, various features of systems 100 (FIG. 3) and 400 (FIG. 6) can be combined in the same system. FIG. 8 illustrates an example in which a system 600 for three-dimensional imaging includes a source 602 arranged to generate structured illumination 104 (e.g., infrared radiation) that projects texture onto a scene including one or more objects. The illumination source 602 can be implemented, for example, as described above for the source 102 in FIG. 3. The system 500 also includes first and second stereo imaging cameras 606A, 606B, which can be implemented, for example, as described above for the stereo imaging cameras 406A, 406B of FIG. 6.

Optical signals sensed by the cameras 606A, 606B are converted to electrical signals that are provided to one or more processor units 614 over respective signal line(s) for processing. The processor unit(s) 614 can include, for example, a central processing unit (CPU) of a personal computing device (e.g., PC, laptop, tablet, personal digital assistant (PDA)) or a standalone microprocessor chip. In some cases, the processor 614 is the processor of a mobile device (e.g., smartphone).

An image captured by one of the cameras (e.g., 606A) can be used as a reference image, whereas an image captured by the other camera (e.g., 606B) can be used as a search image for a block matching algorithm, which allows disparity information to be computed from the pair of stereo images by computing the distance in pixels between the location of a feature in one image and the location of the same or substantially same feature in the other image. The processor unit 614 is operable to select either one of at least two block matching techniques to apply to the acquired images. In particular, the processor unit 614 is operable to use a less computationally complex technique that requires fewer computational resources (e.g., SAD) as well as a more computationally complex technique that requires a greater amount of computational resources (e.g., SGBM). The processor unit 614 also is operable to control turning the illumination source 602 on/off.

Figure 9A:
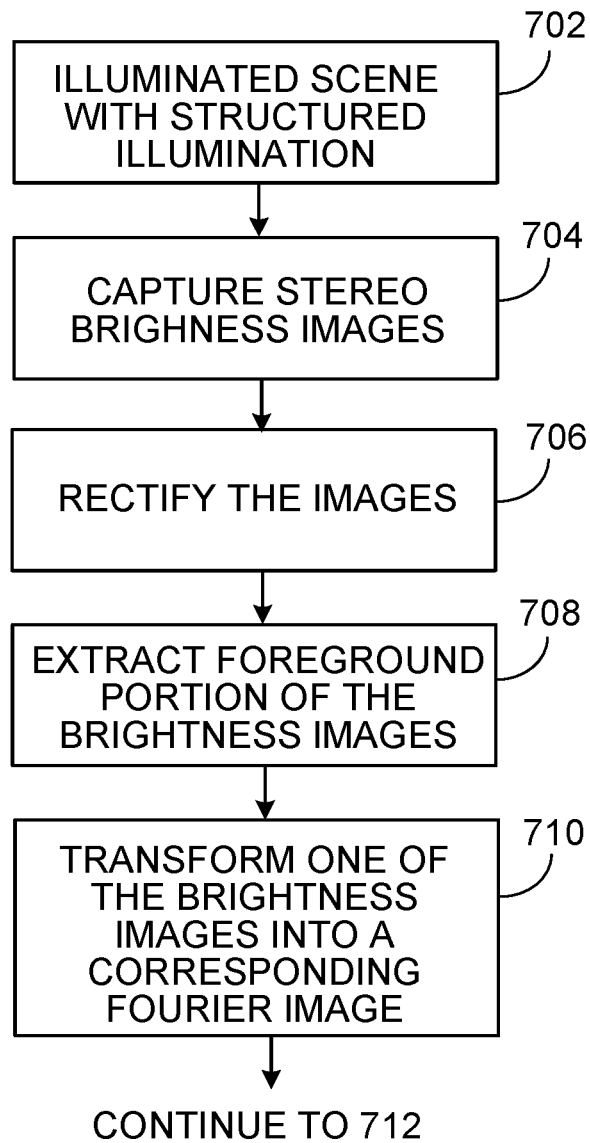
FIGS. 9A and 9B illustrate a method of operation of the system of FIG. 8.
Figure 9B:
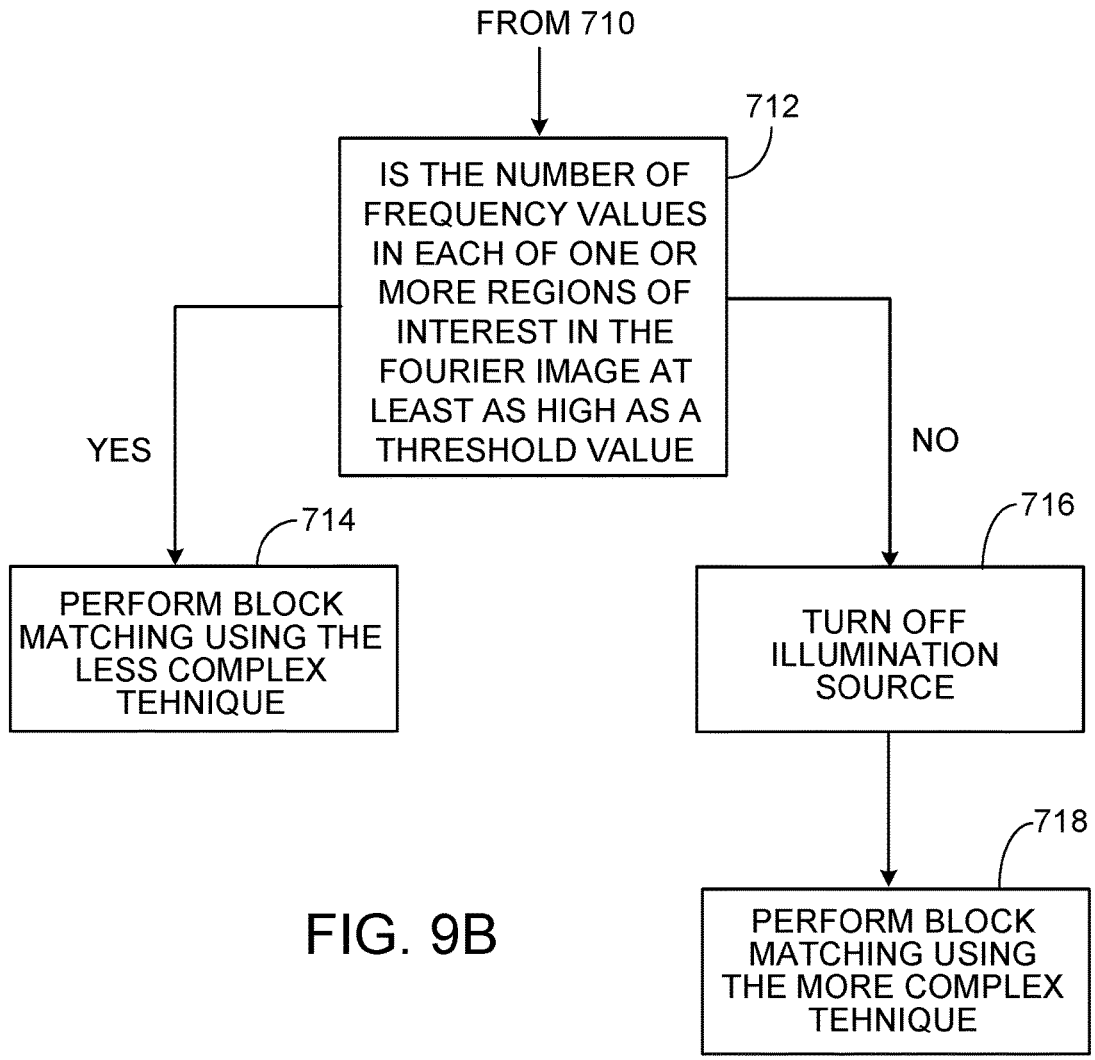

In operation, the illumination source 602 illuminates a scene with structured illumination such as projected texture (see 702 in FIGS. 9A-9B). Each of the stereo cameras 606A, 606B captures a respective brightness image (704). In some instances, the images are rectified, for example, using calibration data (706), and the foreground portion of the brightness images is extracted, for example, by calculating the absolute difference between the stereo pair (708). Next, as indicated by 710, the processor unit 614 transforms one of the brightness images into a corresponding Fourier image (i.e., an image in the frequency domain).

Next, the processor unit 614 determines whether the number (N) of frequency values in each of one or more regions of interest in the Fourier image is at least as high as a threshold value (T) (712). As explained in connection with FIGS. 6 and 7, the threshold value (T) can be set, for example, based on expected characteristics of the detected image.

If the processor unit 614 determines that the number of frequency values in the region of interest is equal to or greater than the threshold value, the determination indicates that (i) the structured illumination generated by the illumination source 602 is likely to provide useful information in the stereo images, and (ii) the simpler block matching technique (e.g., SAD) can be used to obtain the disparity information from the stereo images. In that case, the processor unit 614 performs the block matching using the lower complexity technique (714). Based on results of the block matching technique, the processor unit 614 then computes disparity information for the pair of stereo images. Further, the processor unit 614 may allow the illumination source 602 to continue generating the structured illumination so that further stereo images can be obtained using the structured illumination.

On the other hand, if the processor unit 614 determines (at 712) that the number of frequency values in the region of interest is less than the threshold value, the determination indicates that (i) the structured illumination generated by the illumination source 602 is unlikely to provide useful information in the stereo images, and (ii) the more complex block matching technique (e.g., SGBM) should be used. In that case, the processor unit 614 provides a control signal to adjust the optical power level of the illumination source 602 (e.g., by turning it off) (716) so as not to expend the additional energy required to operate the illumination source 602. Further, the processor unit 614 performs the block matching using the more complex technique (718). Based on results of the block matching technique, the processor unit 614 computes disparity information for the pair of stereo images.

Figure 10:
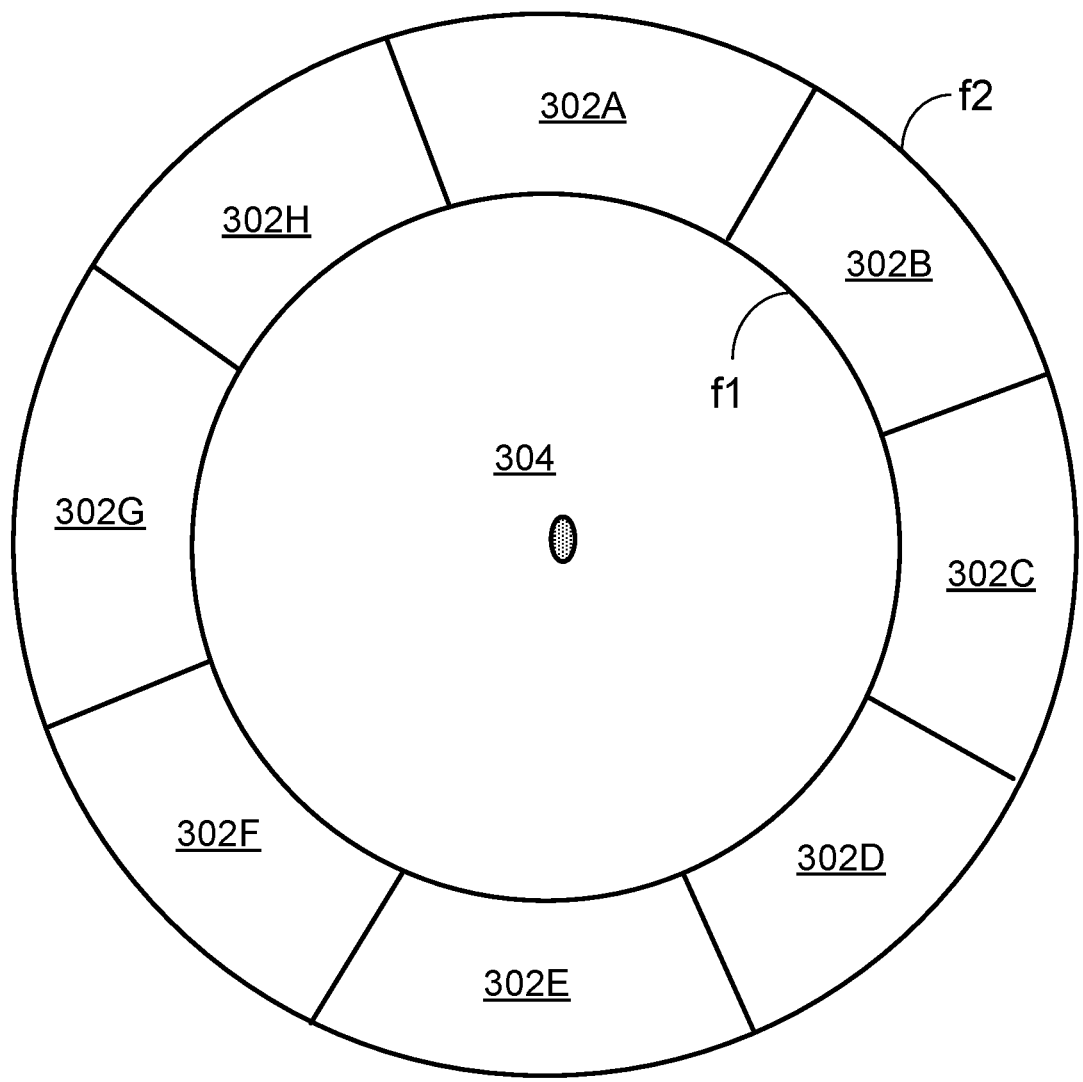
FIG. 10 shows different regions of a Fourier image.

In the foregoing examples, the processor units are configured to determine whether the number of frequencies (having a non-zero magnitude) in each of one or more regions of interest in the frequency domain image is at least as high as a threshold value (see, e.g., 208, 508 and 712 of FIGS. 4, 7 and 9, respectively). In the example of FIG. 5, the region of interest 302 is shown as a single region bounded by a first non-zero frequency value f1 and a second higher frequency value f2. Thus, a single region 302 of the Fourier image is examined to determine whether the number (N) of frequencies having a non-zero amplitude is at least as large as the threshold value (T). However, in some implementations, the frequency domain is divided into multiple regions of interest, and the processor unit determines whether each of at least a predetermined minimum number (n) of the regions of interest contains at least a threshold number (N) of frequencies (having a non-zero amplitude). For example, as shown in FIG. 10, the region between frequencies f1 and f2 is divided into eight sub-regions 302A-302H of equal size. In that case, the processor unit (e.g., 614 in FIG. 8) is operable to determine, for example, whether each of at least five (i.e., n=5) of the sub-regions 302A-302H contains N or more frequency values (having a non-zero amplitude). The processor unit then controls the optical power of the illumination source and/or selects the block matching algorithm based on whether at least five of the sub-regions 302A-302H satisfy the threshold (N).

One rationale for using eight sub-regions as described above in connection with FIG. 10, and for checking whether at least five of the sub-regions contains N or more frequency values is as follows. Higher-order terms in the frequency domain sometimes can be confused with texture in the scene itself. Strong edges in the scene often occur vertically and horizontally. Thus, it can be assumed that four of the sub-regions 302A-302H are associated, respectively, with up, down, left and right from the center of the image. The other four sub-regions are associated with the diagonals. If the processor unit determines, for example, that only four sub-regions satisfy the threshold quantity of frequency values, then it is likely that only edges in the scene itself have been captured rather than the structured illumination. If, on the other hand, five or more sub-regions satisfy the threshold quantity, then it is likely that the structured illumination captured by the cameras also can be discerned.

In some cases, the amplitude (i.e., the brightness) in the Fourier image can be taken account as well. For example, pixels (i.e., data points in the frequency image) having at least a threshold amplitude can be used to provide data for the previously discussed methods, whereas pixels below the threshold amplitude can be considered noise and ignored.

Amplitude also can be used, in some instances, in a factory calibration protocol as follows: 1) A scene is illuminated with the structured illuminations; 2) an image of the scene is collected; 3) the image is converted into a frequency image (e.g., via a Fourier transform); 4) areas of interest are established (as discussed above); 5) the peak amplitude values in the areas of interest are identified; 6) a margin is defined (amplitude within this margin can be included as data in the subsequent algorithm), the margin can be 10% of the peak amplitude for example (the magnitude of this margin can be adjusted by the user or technician in some cases depending, for example, on desired accuracy and/or speed); 7) finally, the algorithm proceeds as discussed above, where the acceptable input to the algorithm are points in the frequency image having those amplitude values as defined above (i.e., between peak and peak minus the margin).

Various implementations described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In some implementations, one or more of the illumination source, the camera(s) and/or the processor unit(s) are integrated within a single compact module.

In some cases, the distance data can be displayed as a computer aided design (CAD) model, for example, on a computer screen. Further, in some cases, the distance data can be provided as input to a 3D printer operable to make a physical object from a three-dimensional digital model, for example, by laying down many successive thin layers of a material. A 3D scanner can be integrated, for example, into a smart phone or other handheld computing device.

As will be readily apparent, various modifications can be made to the foregoing examples within the spirit of the invention. For example, in some instances, some processes or steps may be omitted. Further, in some cases, additional processes or steps may be performed. Other modifications may be made as well. Thus, other implementations are within the scope of the claims.

What is claimed is:

1. An imaging system comprising:
   an illumination source operable to generate structured light with which to illuminate a scene;
   a depth camera sensitive to light generated by the illumination source and operable to detect optical signals reflected by one or more objects in the scene, the depth camera being further operable to convert the detected optical signals to corresponding electrical signals representing a brightness image of the scene;
   one or more processor units operable collectively to receive the electrical signals from the depth camera and operable collectively to:
     transform the brightness image into a corresponding frequency domain image;
     determine whether a threshold condition is satisfied for each of one or more regions of interest in the frequency domain image, the threshold condition being that the number of frequencies in the region of interest is at least as high as a threshold value; and
     generate a control signal to adjust an optical power of the illumination source if it is determined that the threshold condition is satisfied for fewer than a predetermined minimum number of the one or more regions of interest.

2. The imaging system of claim 1 wherein the threshold condition is that the number of frequencies, which have an amplitude at least as high as a threshold amplitude, is at least as high as the threshold value.

3. The imaging system of claim 1 wherein the illumination source is operable to stop generating the structured light in response to receiving the control signal.

4. The imaging system of claim 1 wherein the illumination source is operable to increase an optical power level of the structured light in response to receiving the control signal.

5. A method comprising:
   illuminating a scene with structured light;
   detecting optical signals reflected by one or more objects in the scene;
   converting the detected optical signals to corresponding electrical signals representing a brightness image of the scene;
   transforming the brightness image into a corresponding frequency domain image;

determining whether a threshold condition is satisfied for each of one or more regions of interest in the frequency domain image, the threshold condition being that the number of frequencies in the region of interest is at least as high as a threshold value; and generating a control signal to adjust an optical power of an illumination source that generates the structured light if it is determined that the threshold condition is satisfied for fewer than a predetermined minimum number of the one or more regions of interest.

6. The method of claim 5 wherein the threshold condition is that the number of frequencies, which have an amplitude at least as high as a threshold amplitude, is at least as high as the threshold value.

7. The method of claim 5 including stopping generation of the structured light in response to the control signal.

8. The method of claim 5 including increasing an optical power level of the structured light in response to the control signal.

9. An imaging system comprising:
first and second stereo cameras to detect optical signals reflected by one or more objects in a scene, each of the stereo cameras being operable, respectively, to convert the detected optical signals to corresponding electrical signals representing a brightness image of the scene;
one or more processor units operable collectively to receive the electrical signals from the stereo cameras and operable collectively to:
transform the brightness image from one of the stereo cameras into a corresponding frequency domain image;
determine whether a threshold condition is satisfied for each of one or more regions of interest in the frequency domain image, the threshold condition being that the number of frequencies in the region of interest is at least as high as a threshold value;
apply a first block matching technique to the brightness images from the first and second stereo cameras if it is determined that the threshold condition is satisfied for at least a predetermined minimum number of the one or more regions of interest;
apply a second block matching technique to the brightness images from the first and second stereo cameras if it is determined that the threshold condition is not satisfied for at least a predetermined minimum number of the one or more regions of interest, wherein the second block matching technique is different from the first block matching technique; and
derive data indicative of distance to the one or more objects in the scene based on results of the applied block matching technique.

10. The imaging system of claim 9 wherein the first block matching technique consumes less computational resources than the second block matching technique.

11. The imaging system of claim 9 wherein the first block matching technique comprises a sum of absolute differences technique.

12. The imaging system of claim 9 wherein the second block matching technique comprises a global or semi-global block matching technique.

13. The imaging system of claim 9 wherein the threshold condition is that the number of frequencies, which have an amplitude at least as high as a threshold amplitude, is at least as high as the threshold value.

14. A method comprising:
acquiring first and second stereo images of a scene;
transforming a first one of the stereo images into a corresponding frequency domain image;
determining whether a threshold condition is satisfied for each of one or more regions of interest in the frequency domain image, the threshold condition being that the number of frequencies in the region of interest is at least as high as a threshold value;
applying a first block matching technique to the first and second stereo images if it is determined that the threshold condition is satisfied for at least a predetermined minimum number of the one or more regions of interest;
applying a second block matching technique to the first and second images if it is determined that the threshold condition is not satisfied for at least a predetermined minimum number of the one or more regions of interest, wherein the second block matching technique is different from the first block matching technique; and
deriving data indicative of distance to one or more objects in the scene based on results of the applied block matching technique.

15. The method of claim 14 wherein the first block matching technique consumes less computational resources than the second block matching technique.

16. The method of claim 14 wherein the first block matching technique comprises a sum of absolute differences technique.

17. The method of claim 14 wherein the second block matching technique comprises a global or semi-global block matching technique.

18. The method of claim 14 wherein the threshold condition is that the number of frequencies, which have an amplitude at least as high as a threshold amplitude, is at least as high as the threshold value.

* * * * *